United States Patent

[11] 3,553,453

| [72] | Inventor | William J. Hogan |
| --- | --- | --- |
| | | Philadelphia, Pa. |
| [21] | Appl. No. | 721,735 |
| [22] | Filed | Apr. 16, 1968 |
| [45] | Patented | Jan. 5, 1971 |
| [73] | Assignee | Sybron Corporation |
| | | Rochester, N.Y. |
| | | a corporation of New York |

[54] AUTOMATIC FILM LOADER FOR X-RAY MACHINE
6 Claims, 18 Drawing Figs.

| [52] | U.S. Cl. | 250/66 |
| --- | --- | --- |
| [51] | Int. Cl. | H05g 1/02 |
| [50] | Field of Search | 250/66, 65 |

[56] References Cited
UNITED STATES PATENTS

| 2,617,944 | 11/1952 | Sanchez-Perez | 250/66 |
| --- | --- | --- | --- |
| 2,652,498 | 9/1953 | Snook et al. | 250/66 |
| 2,815,451 | 12/1957 | Heimerich | 250/66 |
| 2,831,979 | 4/1958 | Kallenberg et al. | 250/66 |
| 2,847,580 | 8/1958 | Arvanetakis | 250/66 |
| 2,872,585 | 2/1959 | Kallenberg et al. | 250/66 |
| 2,943,198 | 6/1960 | Godbarsen | 250/66 |
| 3,173,011 | 3/1965 | Barrett et al. | 250/66 |
| 3,415,988 | 12/1968 | Gidlund | 250/66 |

*Primary Examiner*—James W. Lawrence
*Assistant Examiner*—C. E. Church
*Attorney*—Paul and Paul

ABSTRACT: An automatic film loader for a chest X-ray machine is disclosed comprising a film supply magazine, automatic means for taking a film sheet from the supply magazine and moving it into position at the exposure station, and (following exposure) automatic means for moving the exposed film from the exposure station into a film-receiving magazine.

PATENTED JAN 5 1971

INVENTOR.
WILLIAM J. HOGAN
BY
Paul + Paul
ATTORNEYS.

INVENTOR.
WILLIAM J. HOGAN
BY Paul & Paul
ATTORNEYS.

INVENTOR.
WILLIAM J. HOGAN
BY
Paul & Paul
ATTORNEYS.

INVENTOR.
WILLIAM J. HOGAN

INVENTOR.
WILLIAM J. HOGAN
BY Paul & Paul
ATTORNEYS.

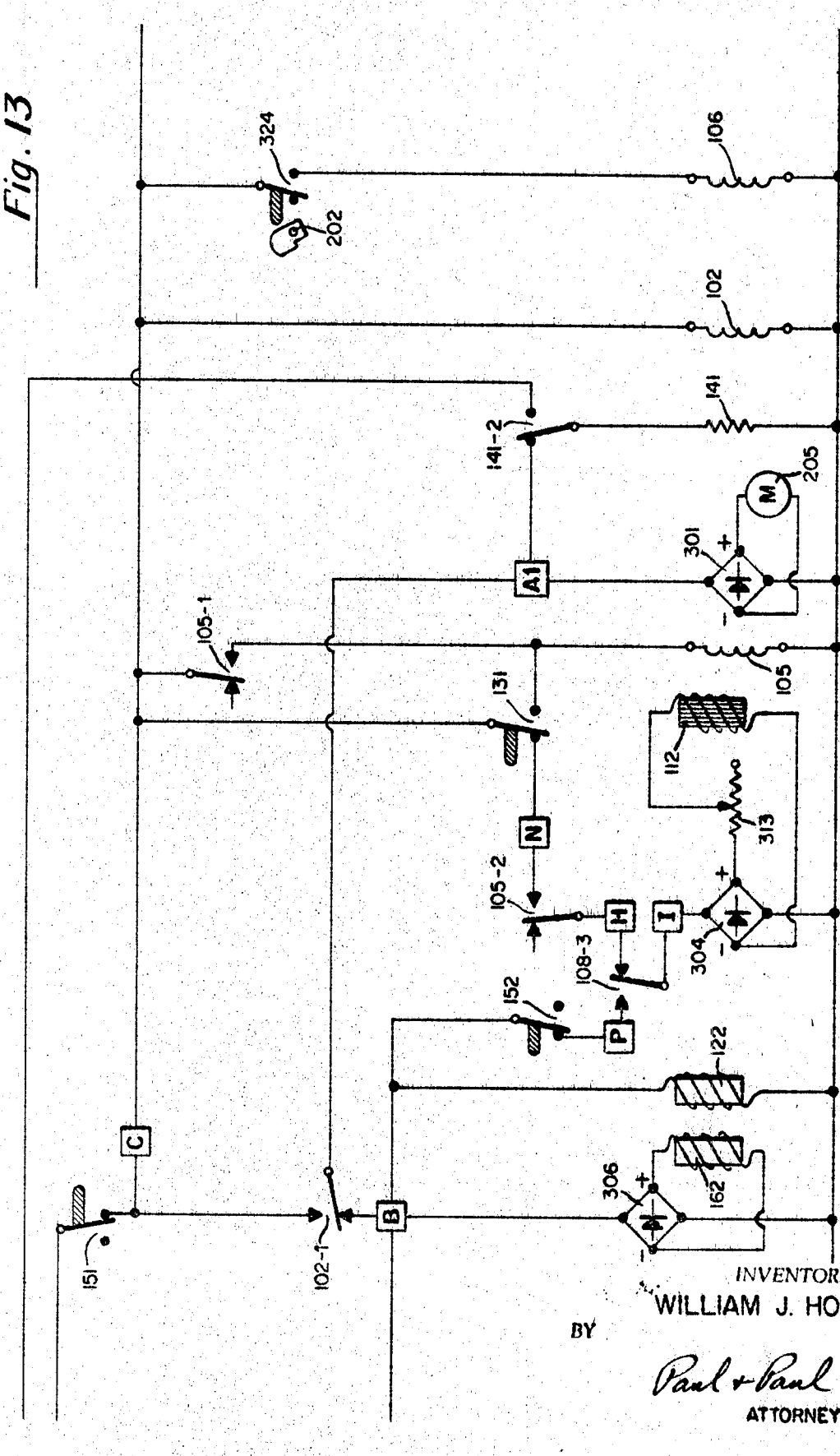

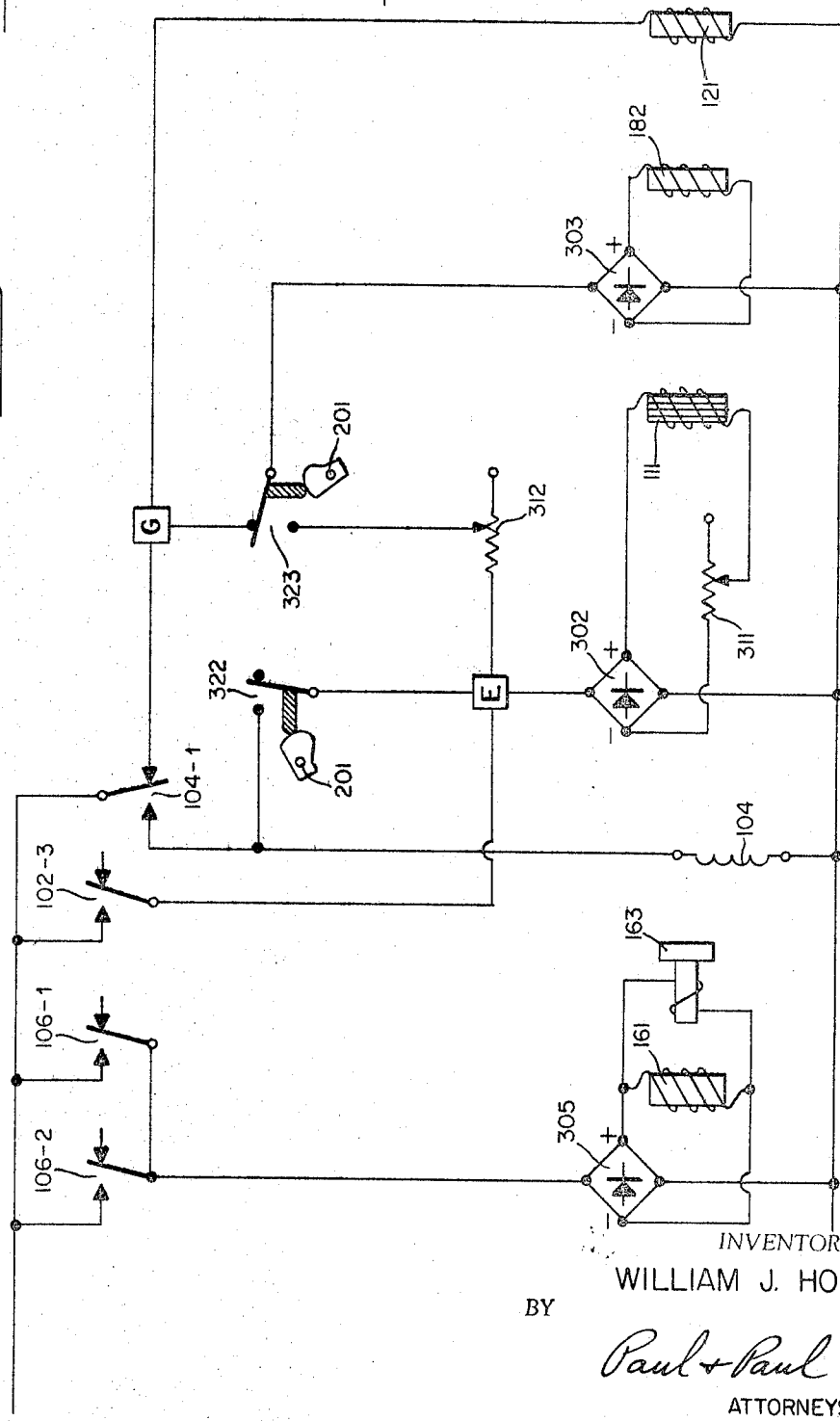

AUTOMATIC FILM LOADER FOR X-RAY MACHINE

FIELD OF THE INVENTION

This invention relates to X-ray machines, and particularly to film loaders for chest X-ray machines.

SUMMARY OF THE INVENTION

The present invention provides a fully automatic film loader for a chest X-ray machine. In response to a start signal, and using electrical relays, electromagnetic clutches, solenoids, cams, gears, sprockets, timers, and the like, a vertically disposed sheet of film is taken automatically from a supply magazine, transported on its edge into position at the exposure station, and, following exposure, is taken from the exposure station and deposited on its edge in the receiving magazine.

BRIEF DESCRIPTION OF THE DRAWINGS

FIGS. 12—14 combined as indicated in FIG. 15 represent a schematic diagram of the electrical control circuit; and FIGS. 16—18 are schematic diagrams of auxiliary control circuits, manually controlled by the operator of the X-ray machine.

DESCRIPTION OF THE PREFERRED EMBODIMENTS

Figure 1:
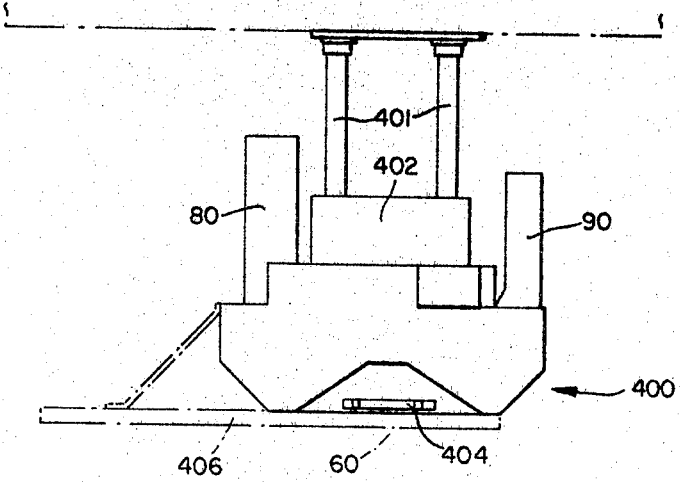
FIG. 1 is a diagrammatic plan view of the film loading unit.
Figure 2:
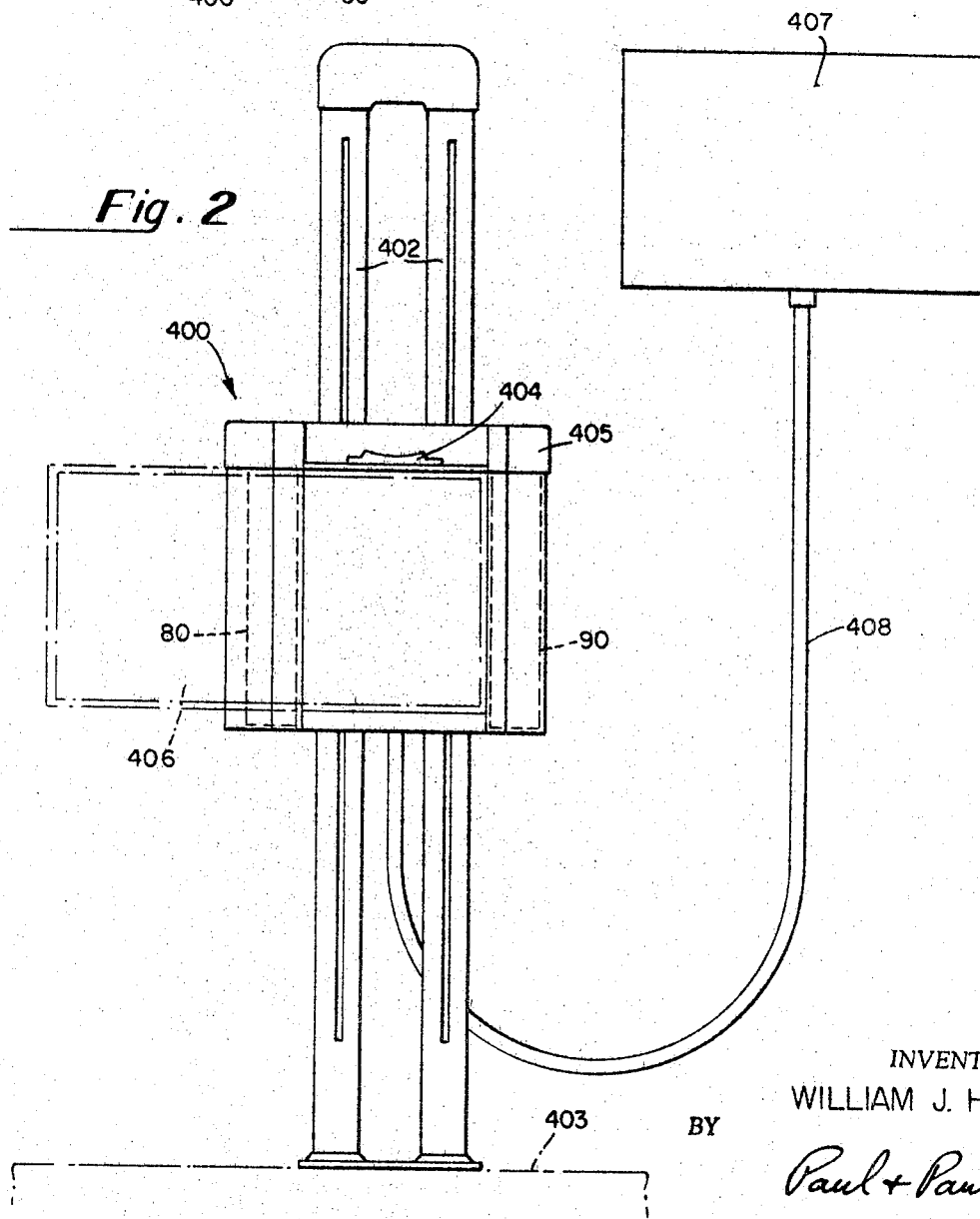
FIG. 2 is a diagrammatic front elevational view of the unit of FIG. 1, showing in addition the electrical control cabinet.

Referring first to FIGS. 1 and 2, these FIGS. show diagrammatically the film loader unit 400 mounted, as by a pair of horizontal arms 401, on an upright standard 402 supported on a base 403. The unit 400 is adapted to be driven up and down (by a motor not shown) to the desired vertical position to accommodate the particular patient whose chest is to be X-rayed. A chin rest 404 is provided to assist in determining the proper vertical position of the unit relative to the patient. The unit has a top cover 405 and may be provided with a grid carrier 406.

The film loader unit 400 is shown to comprise a film supply magazine 80 (on the left) and an exposed film receiver magazine 90 (on the right). The exposure station 60 is at the front center of the unit, between the supply magazine 80 and the receiver magazine 90. The operation of the film loader is controlled by relays and other control mechanism located in an electrical control cabinet 407 which is connected to the film loader unit by a cable 408.

Referring now to FIGS. 3—9, and summarizing the operation of the unit, the cut film or sheets of film 100 are moved automatically, one at a time, from the supply magazine 80, shown on the left of the drawing, to the exposure station 60 at the front center of the unit, and, after the exposure is completed, the exposed film is moved automatically into the film receiver magazine 90, shown at the right.

Still describing the action generally, a sheet of film 100a is moved out of the supply magazine 80 by a pair of film advance sectors 83 (FIG. 4) and into the nip of the film advance rollers 85, 185. These advance rollers pass the film into the nip of a first set of transport rollers 87, 187, and the transport rollers 87, 187 move the film into the exposure station. Final positioning of the film sheet 100a at the exposure station 60 is achieved by a pair of film-positioning cams or levers 88 which push against the trailing edge of the film. After the exposure has been made, the cams 88 again push against the exposed film sheet 100a, pushing the film further to the right, sufficiently to have the leading edge of the film engaged by the nip of the take-away rollers 96, 196. These take-away rollers feed the film sheet into a second set of transport rollers 94, 194, and the transport rollers 94, 194 deliver the exposed film sheet into the front part of the receiver magazine. The film sheet 100a is then pushed into its final position in the receiver magazine 90 by a pair of film-engaging sector cams 93 which are fixed to shaft 204 and driven rotationally through 360°.

Further details of the structure and operation of the unit 400 now follow. A complete description of the controls and control circuitry will be given last.

The sheets of film 100 in the supply magazine 80 are pressed against the left wall 176 by a film pressure plate 81 pivotally supported at the front end of a plunger 82 controlled by a solenoid 182. Under the control of electrical circuitry shown in FIGS. 12—18 and later described, the pair of film advance sector cams 83 on shaft 201 are rotated by sprocket 27 in a clockwise direction (as viewed in FIGS. 5 and 8) thereby to move the leftmost film sheet 100a forward and into the nip of the film advance rollers 87, 187. When the leading edge of the film 100a engages the fingers 231, the fingers are moved to the position shown in phantom in FIG. 8, and the shaft 233 is rotated. As a result, cam 234 (FIG. 6) actuates film switch 131, and a relay 105 is energized to set up a circuit so that when the trailing edge of the film 100a passes the fingers 231 and the switch 131 relaxes, an electromagnetic clutch 112 is energized to drive shaft 12. However, clutch release solenoid 122 is not at this time energized and cam stop 45 stops shaft 12 after shafts 12 and 202 have rotated 60° counterclockwise from the spring-biased rest position of shaft 202, indicated in the drawing by the spring 47 and stop pin 48. Thus, the film positioning cams 88 on shaft 202 are only moved from the leftmost phantom position to the solid line position shown in FIG. 8. At this position, cams 88 on shaft 202 are stopped by cam stop 45 stopping rotation of shaft 12. The sheet of film 100a is now in the desired position for exposure. A pair of stop fingers 72 assures that the leading edge of the film 100a does not enter the nip of the take-away rollers.

Figure 5:
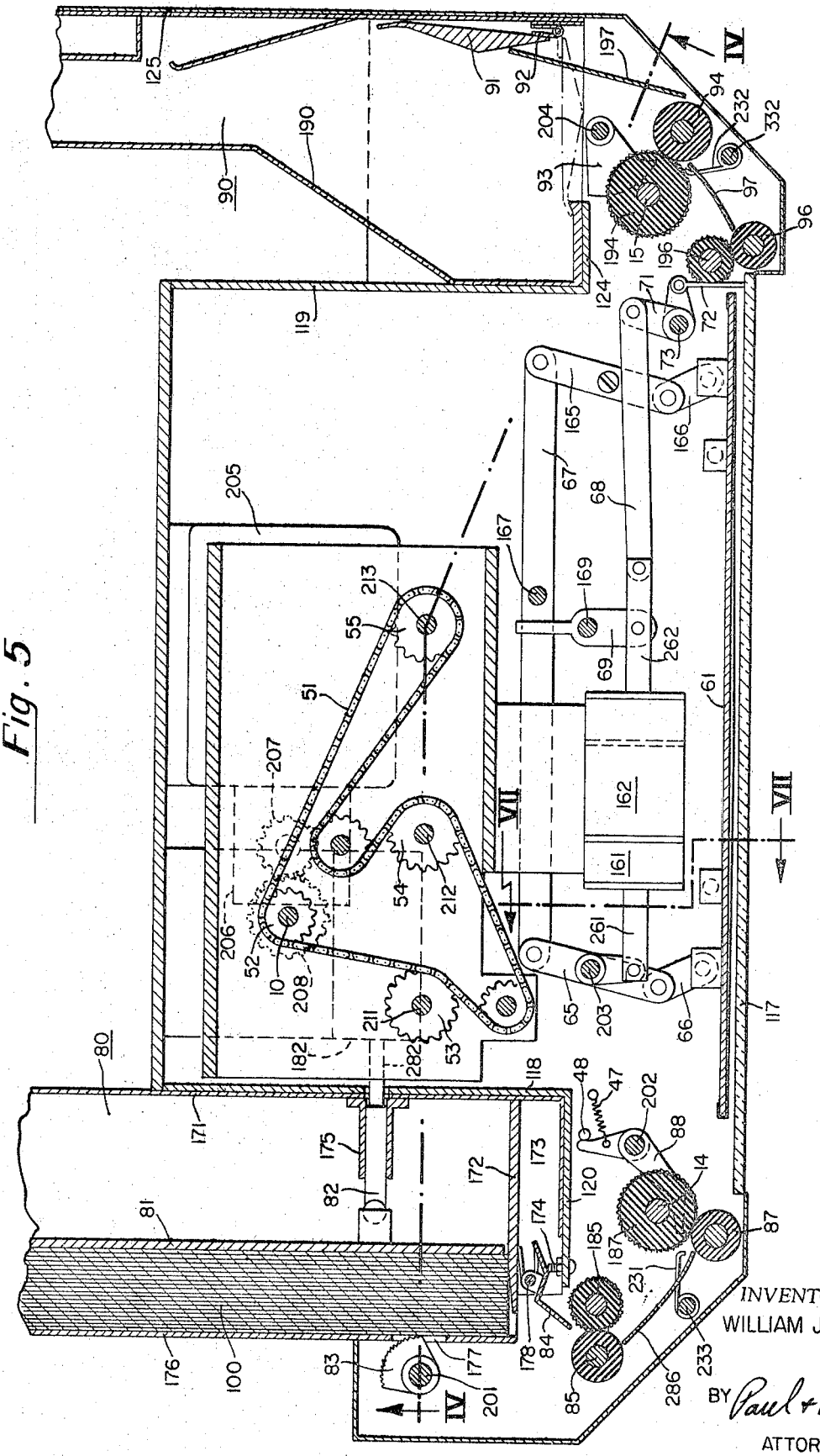
FIG. 5 is a plan view, partly in section, looking down along the line V-V of FIG. 4.
Figure 7:
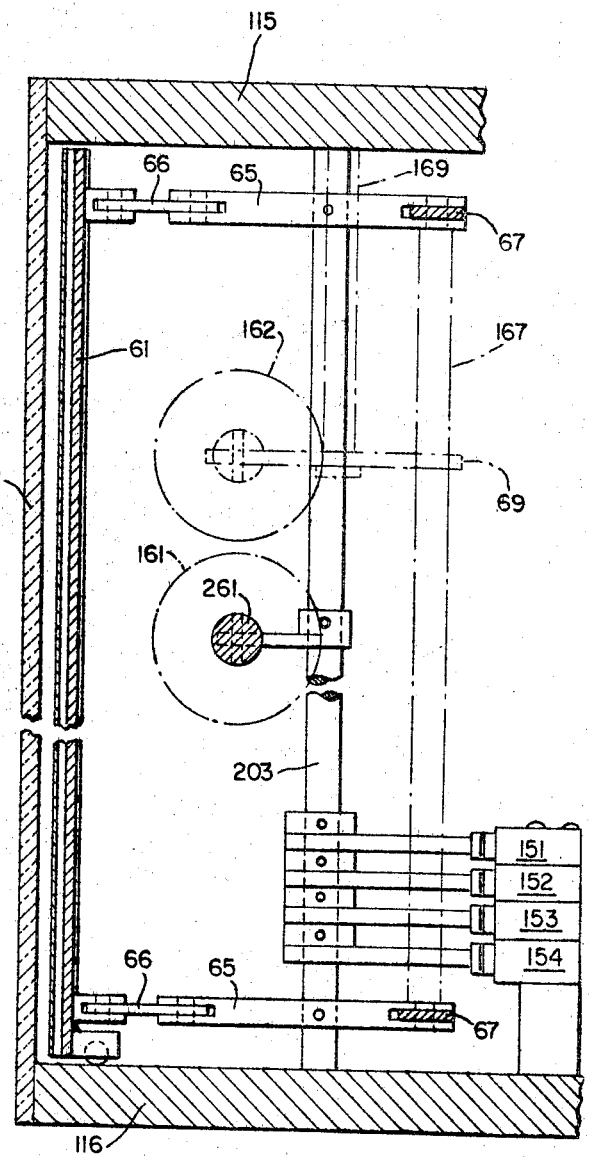
FIG. 7 is an elevational view, partly in section, at the exposure station, looking toward the left along the bent line VII-VII of FIG. 5.

When shaft 202 rotates through the 60° angle just described, cam switch 324 becomes closed, and the closing of cam switch 324 energizes a relay 106 which controls energizing of the plate-closing solenoid 161 (FIG. 5). The plunger 261 of solenoid 161 is retracted and through suitable linkage the plate 61 is moved forward to press against the film sheet 100a, thereby to press the film sheet against the glass plate 117 at the exposure position. The linkage referred to includes a pair of arms 65 (an upper and a lower arm as seen in FIG. 7) which pivot counterclockwise about shaft 203 (as viewed in FIG. 5) pulling rod 67 to the left and causing upper and lower arms 165 at the right end of rod 67 to also pivot counterclockwise. Thus, links 66 and 166 are pushed forward, thereby pushing plate 61 forward.

When the pressure plate 61 is moved forward to the closed position, four switches 151—154 (FIG. 7) are actuated to accomplish various purposes, one of which is to shut down the automatic film loading unit, which is now ready for an exposure. Shaft 202 returns to its spring-biased rest position, and cams 88 return to the leftmost phantom position.

The taking of the exposure is under the control of the operator, as by manually pushing a button. When the exposure is being made, a relay 107 is energized which closes a circuit through another relay 108 which sets up a circuit so that when the exposure ends and relay 107 relaxes, a solenoid 162 is energized to retract its plunger 262 to pull plate rearwardly by suitable linkage. In the drawing, when plunger 262 is pulled in, arm 69 pivots clockwise about shaft 169 and the rear end of the arm 69 pushes against rod 167, thereby pushing rods 67 to the right and causing arms 65 and 165 to pivot clockwise about their respective shafts, thereby withdrawing links 66 and 166 and the pressure plate 61.

When plunger 262 is retracted as just described, extension 68 pulls a pair of arms 71 (upper and lower arms 71) counterclockwise about the shaft 73 and moves the pair of stop fingers 72 rearwardly, out of the path of the film 100a.

It was mentioned above that at the end of the exposure, a relay 107 is relaxed and the plate-opening solenoid 162 is energized. Several other things also occur when relay 107 relaxes: (1) The main motor 205 is again energized; (2) clutch 112 is again energized; and (3) the clutch release solenoid 122 is energized, thus withdrawing the cam stop 45.

When clutch 112 is again energized, shaft 12 is driven counterclockwise, thus driving shaft 202 counterclockwise. The push cams 88 now rotate from their rest position, (the leftmost phantom position in FIG. 9, to the solid line position and beyond) and in so doing push the film sheet 100a into the nip of the take-away rollers 96, 196. Since the main motor 205 is now again running, the take-away rollers 96, 196 are being driven (by chain 16, shaft 15, and gear means 296, later to be described) and as a result, the exposed film sheet 100a is fed toward the transport rollers 94, 194 guided by guide 97. Transport rollers 94, 194 are at this time also rotating.

Figure 10:
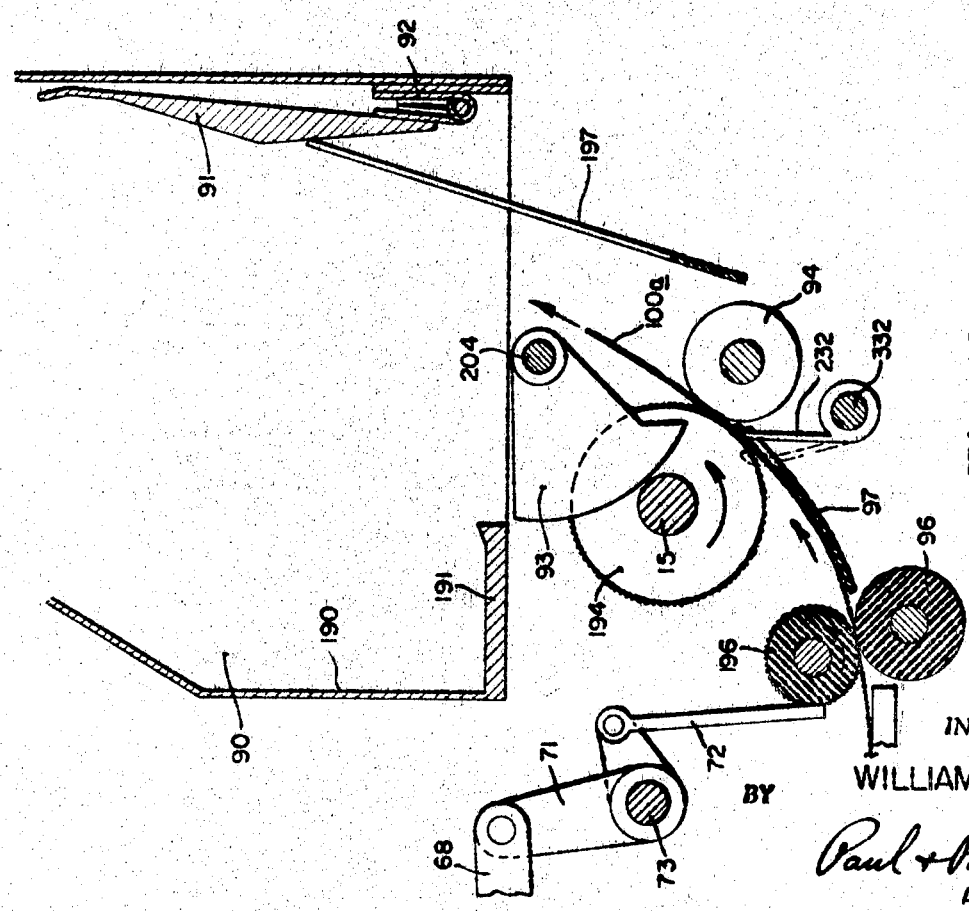
FIG. 10 is a plan view, partly in section, looking down at the take-away or receiving side of the machine.

As the leading edge of the film 100a passes fingers 232 of the film switch 132, the fingers are moved to the solid line position shown in FIG. 10. This actuates the film switch 132 mounted at the upper end of 332, and as a result a relay 109 is energized. This sets up a circuit in which another relay 110 is energized and locked in.

When the trailing edge of the film sheet 100a passes the film-switch fingers 232, the film-switch switch 132 relaxes, and the clutch release solenoid 123 is energized and the cam stop 46 is retracted. Clutch 113 is also energized, and shaft 13 is driven, thereby driving chain 19 and shaft 204. Thus, when the trailing edge of the film sheet 100a reaches the nip of the transport rollers 94, 194, the trailing edge of the film is engaged by the sector cams 93 and pushed through the open door of the receiver magazine 90 into the magazine.

Figure 3:
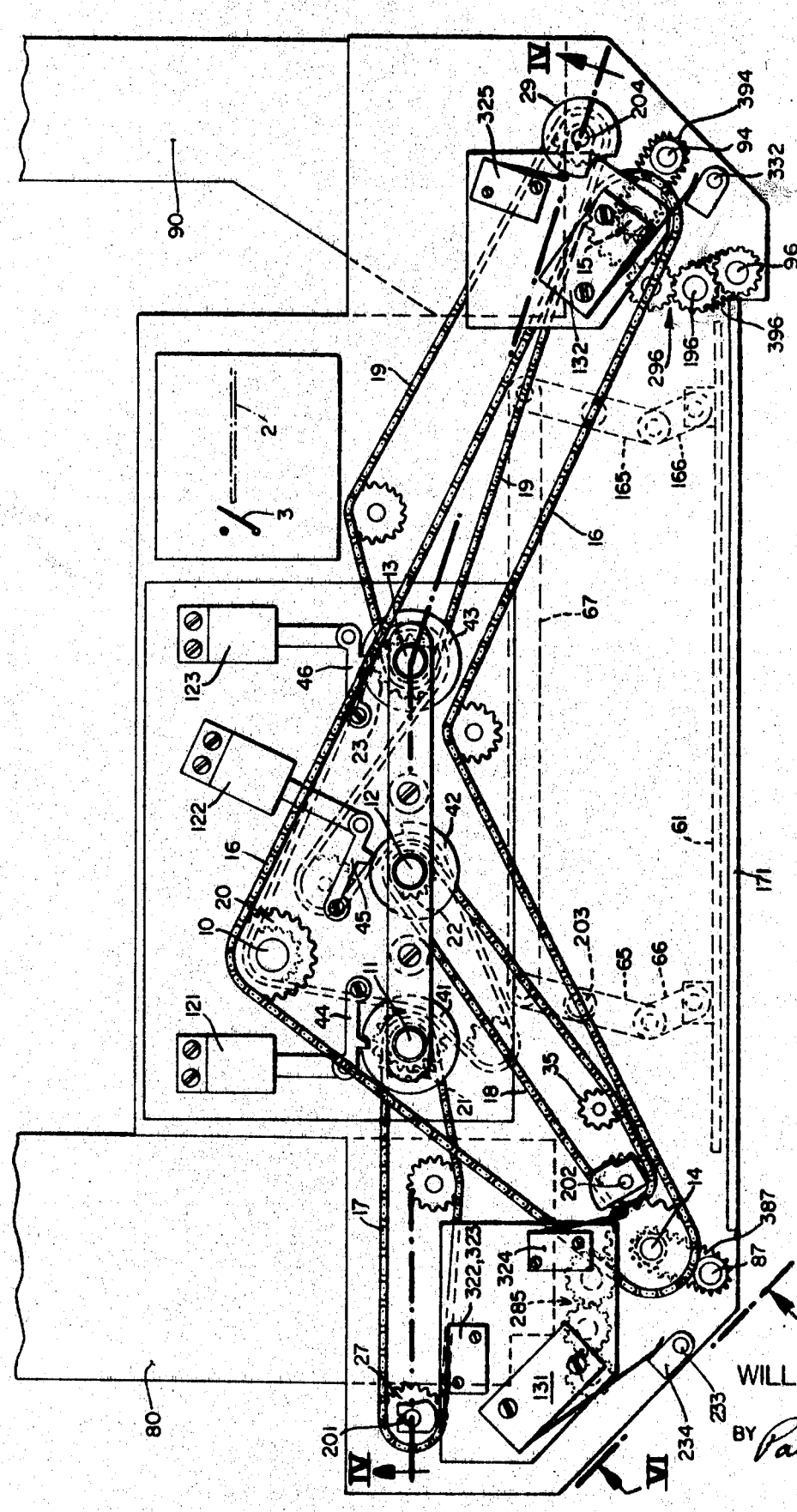
FIG. 3 is a plan view of the X-ray loader with the top cover removed.
Figure 4:
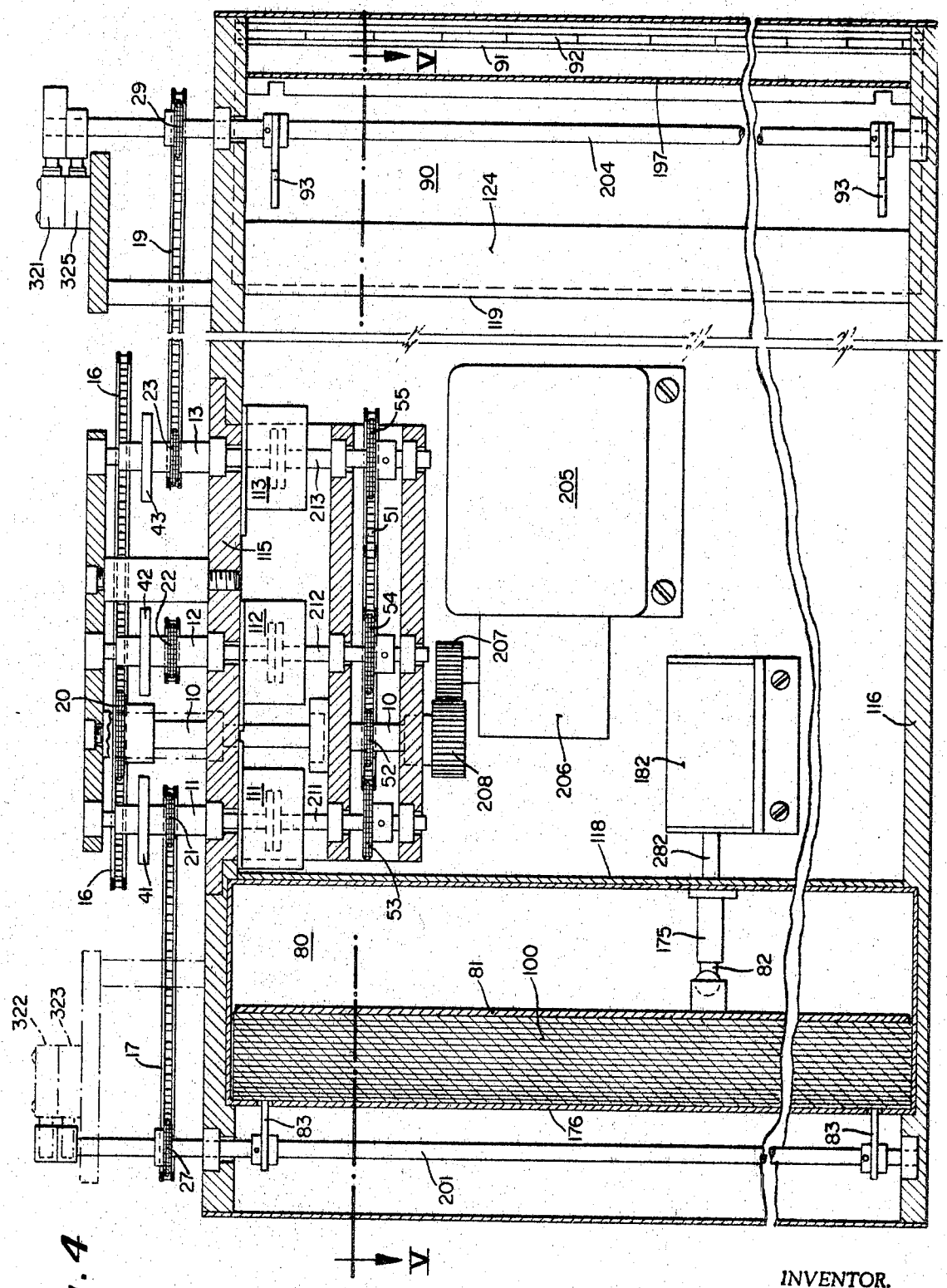
FIG. 4 is an elevational view, partly in section, looking along the bent line IV-IV of FIG. 3.

The means by which various shafts are driven will now be briefly described. As seen in FIG. 4, a motor 205 drives, through reduction gearing 206, a gear 207 which meshes with and drives a gear 208 fixed to the lower end of the main drive shaft 10. The main drive shaft 10 is supported in suitable bearing supports in plate 115 and in other plates of the frame of the machine. Fixed to the upper end portion of the drive shaft 10 is a sprocket 20 which drives a chain 16 which, as seen in FIG. 3, drives sprockets 24 and 25 fixed to shafts 14 and 15, respectively, located on opposite sides of the exposure station 60. Chain 16 also passes about an idler pulley 26, centrally located.

As seen in FIGS. 4 and 5, fixed to a lower portion of the main drive shaft 10 is a sprocket 52 which drives a chain 51 which drives the sprockets 53, 54 and 55 fixed to shafts 211, 212 and 213, respectively. Shaft 211 is driven clockwise. Shafts 212 and 213 are driven counterclockwise. Shafts 211, 212 and 213 are aligned vertically with shafts 11, 12 and 13, respectively, and coupled thereto by electromagnetic clutches 111, 112, and 113.

Fixed to the shafts 11, 12 and 13 are sprockets 21, 22 and 23, respectively. These sprockets drive the chains 17, 18 and 19, respectively. Chains 17, 18 and 19 drive the sprockets 27, 28 and 29, fixed to shafts 201, 202, 204, respectively.

Whether or not the shafts 201, 202 and 204 are driven depends then upon the conditions at that time of the electromagnetic clutches 111, 112, and 113. The extent to which shafts 201, 202 and 204 are allowed to rotate depends upon the conditions of the clutch-release solenoids 121, 122 and 123 since these solenoids control the positions of the cam stops 44, 45 and 46, respectively.

The film advance rollers 85, 185 and the take-away rollers 96, 196 are driven by shafts 14 and 15, respectively, through gear trains 285 and 296, respectively. Each of these gear trains includes four gears as follows: one on the driving shaft (14 or 15), an idler gear, and one on each of the roller shafts.

Figure 6:
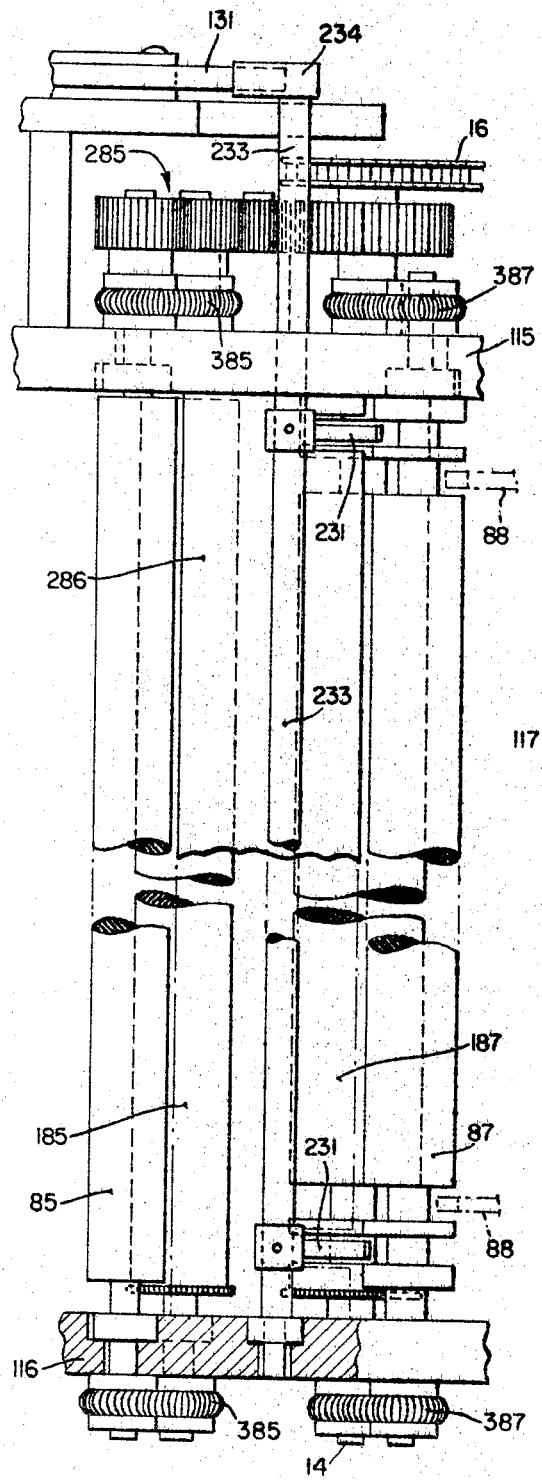
FIG. 6 is an elevational view looking in at the feed side of the film loader along the line VI-VI of FIG. 3.

As seen in FIG. 6, the film advance rollers 85, 185 are held together in pressure-applying relation by a pair of tension springs 385, one at each end of the rollers 85, 185. Similarly, the transport rollers 87, 187 are held together in pressure-applying relation by a pair of tension springs 387, one at each end of the rollers. Similar pairs of tension springs 396 and 394 hold the take-away rollers 96, 196 and the transport rollers 94, 194 in pressure-applying relation.

A few details regarding the film supply magazine 80 and the film receiver magazine 90 will now be given. These magazines 80 and 90 are inserted into the main housing of the film loader unit 400 by pushing the magazines forwardly into recesses at the left and right sides, respectively, of the main housing.

The film supply magazine 80 is a light-tight container or box having a backwall (not shown), sidewalls 171 and 176, and a forward wall 172. An opening is provided at the left edge portion of the forward wall. When magazine 80 is out of the main housing of the unit 400, this opening is closed by a door 84 pivotally mounted on a post 178 and spring biased to closed position, as shown in phantom in FIG. 8. Projecting forwardly from the front wall of the supply magazine 80 is a forward compartment 173 adapted to abut against the wall 120 of the main housing when the supply magazine 80 is fully inserted into the film loader housing. Mounted in the wall 120 of the main housing is a stud 174 which projects rearwardly and is so located that when the magazine 80 is fully inserted the stud 174 engages a portion of the door 84 causing it to pivot about its pivot post 178, and holding the door open so long as the magazine 80 is in the main unit.

Mounted on the wall 171 of the magazine 80 is a cylindrical support 175 which supports a pressure plunger 82, the forward end of which is pivotally connected to the pressure plate 81. The film pressure solenoid 182 has a plunger 282 which is adapted to pass through registered openings in the wall 118 of the main housing and wall 171 of the supply magazine 80 and abut against the end of the plunger 82.

The slots 177 which are provided in the outer wall 176 of the supply magazine 80 for receiving the film advance segments 83 are closed by shutters (not shown) when the magazine 80 is out of the main housing. When the magazine is inserted into the main housing, the shutters are held open by pins (not shown).

Figure 11:
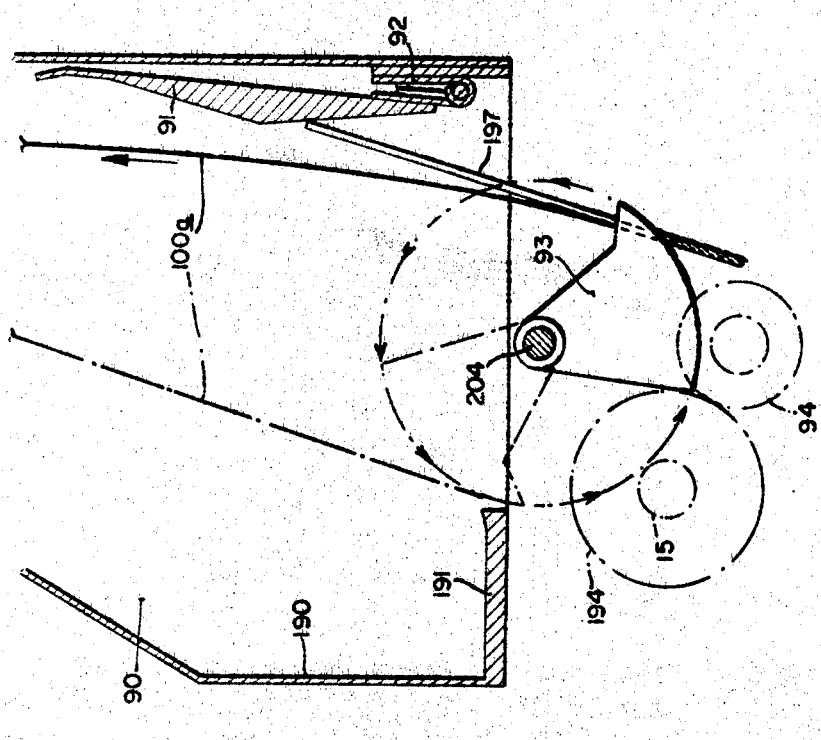
FIG. 11 is a diagrammatic view looking down at the entrance to the receiving magazine.

The film receiver magazine 90, at the right side of the main housing, is insertable in the forward direction into the recess formed by the walls 119, 124 and 125 of the main housing. The receiver magazine 90 is provided with a front door 91 which, when the magazine 90 is out of the main housing, is held closed by the spring biased hinge 92. When the receiver magazine 90 is inserted forwardly into the main housing, the front door 91 meets and is pushed and held open by the edge of the plate 197 so long as the magazine 90 is in the main unit. When the receiver magazine 90 becomes filled with exposed film and is withdrawn from the main unit, the spring biased hinge 92 closes the door 91, and a light-tight seal is effected. As seen in the drawing, the forward portion of the receiver magazine 90 is made wider than the rear portion, thereby to provide space into which the rear portions of the film sheets are pushed during the closing of the door 91, as indicated in phantom in FIG. 11.

OPERATION

Figure 12:
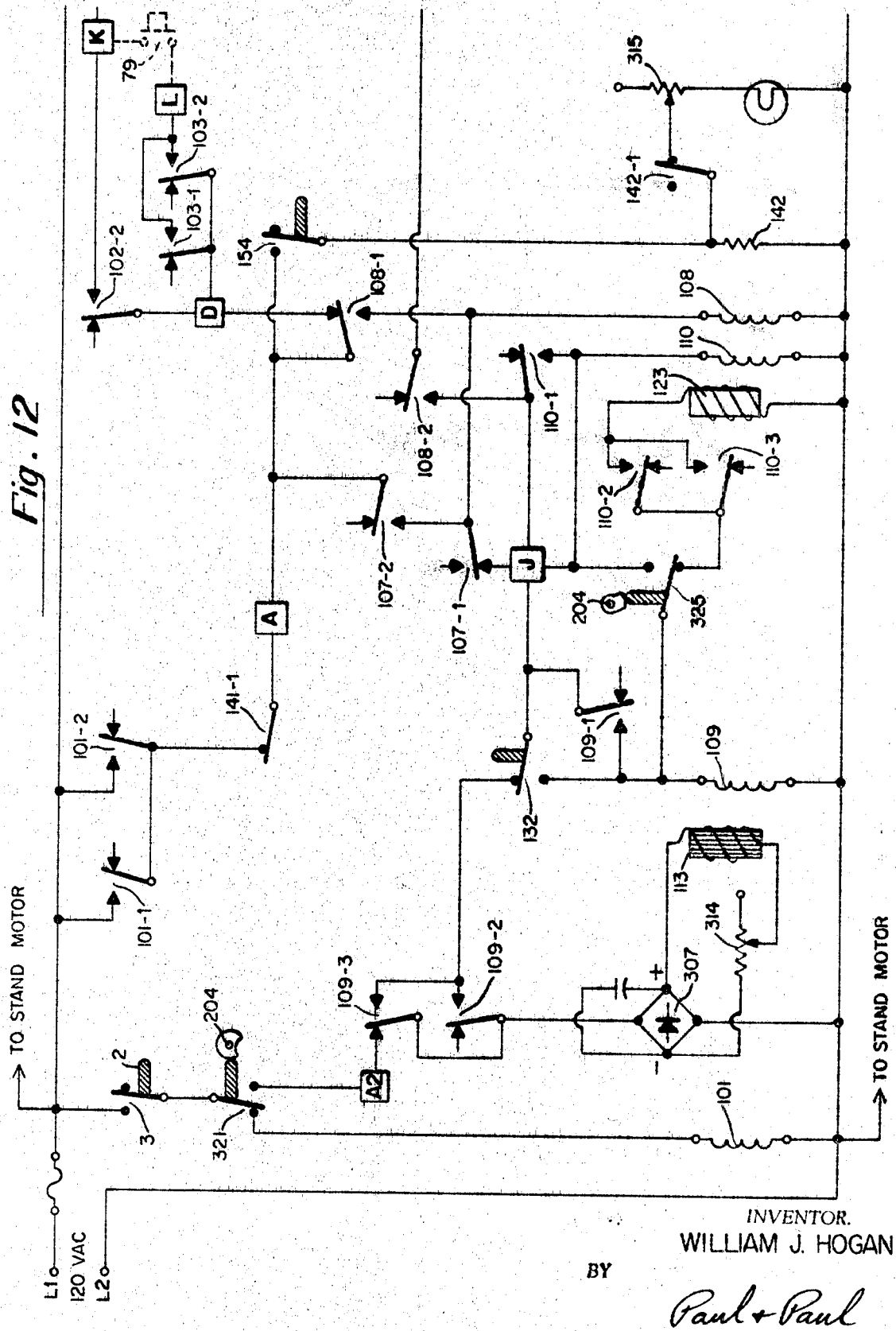

FIGS. 12, 13 and 14, when placed in side-by-side positions in the order indicated in FIG. 15, together represent a schematic circuit diagram of the electrical system which controls the operation of the automatic film loader. In this schematic diagram, all switches are shown at rest, and all relay contacts are, for ease of reference, identified by the reference number of the relay and the reference number of the contacts. For example, 101—2 means contact 02 of relay 101. FIGS. 16—18 are schematics of some auxiliary circuits.

The operation of the automatic film loader 400 will now be described having reference to the schematic circuit diagrams of FIGS. 12—18 and also to the structures shown in FIGS. 1-—11.

Line voltage, assumed to be 120 v. AC, is provided between the terminals L1 and L2. L2 is the common terminal. The vertical standard motor (not shown), for adjusting the vertical position of the unit 400 on standard 403, is connected across the line terminals L1–L2.

When a patient identification card 2 is inserted into the machine 400 (FIGS. 3 and 12), the card switch 3 is closed by the card. This completes a circuit from L1 to L2 through the coil of relay 101 and as a result the parallel contact arms of contact 01 and 02 of relay 101 move to the energized positions. This provides L1 potential to terminal A through the normally closed contacts 01 of the time delay switch 142, and thus potential L1 is provided to terminal D through the normally closed contacts 01 of relay 108.

The rotor control circuit shown in FIG. 14 provides 120 v. AC across the coil of relay 103 and the parallel contact arms of contacts 01 and 02 of relay 103 move to the closed position. This provides L1 potential at terminal L and prepares the unit for a film advance.

Depressing the start switch 79 connects terminal L to terminal K, and since terminal K is normally connected through the plate switch 151 to terminal C, L1 potential appears at terminal C.

The appearance of L1 potential at terminal C completes a circuit to L2 through the coil of relay 102. When relay 102 is thus energized, the contact arm of contacts 02 of relay 102 moves to the energized position and locks in the circuit to terminal C, so that even though the start switch 79 is only held closed momentarily, the presence of L1 line potential at C is maintained. The contact arm of contacts 01 of the energized relay 102 moves to the energized position, thereby providing L1 potential at terminal A1. This completes a circuit through rectifier 301, and the rectified voltage is applied across and energizes the main drive motor 205. The contact arm of contacts 03 of relay 102 moves to the energized position and provides L1 potential at terminal E. This completes a circuit through rectifier 102 and energizes clutch 111, thereby driving the shaft 11.

The appearance of L1 potential at terminal C also completes a circuit to terminal G, and through rectifier 303 to L2. The rectified voltage across 303 energizes the film pressure solenoid 182 to provide maximum pressure, by way of plunger 82 and plate 81, on the film in the supply magazine 80.

The presence of L1 potential at terminal C also completes a circuit to L2 through the clutch release solenoid 121, and the plunger thereof is withdrawn to withdraw the cam stop 44, thereby allowing the chain 17 to drive the shaft 201.

Rotation of the shaft 201 rotates the cam switch 323 which moves to complete a circuit from L1 to L2 by way of contacts 03 of relay 102, terminal E, resistance 312 and rectifier 302, and as a result a reduced voltage is applied across the film pressure solenoid 182, thereby reducing the pressure on the films in the supply magazine 80.

Rotation of shaft 201 also rotates cam switch 322 which moves to complete a circuit from terminal E through the coil of relay 104. The contact arm of contacts 01 of relay 104 then moves to lock in the coil of relay 104 and at the same time opens the circuit to, and deenergizes, the clutch release solenoid 121, thereby returning the cam stop 44 to the stop position. This limits the rotation of shaft 201 to 360°.

When relay 104 is energized, the contacts 2 of the relay open, as seen in FIG. 17, thereby opening the exposure signal circuit and preventing or blocking any possibility of an exposure at this time.

At this time in the cycle, the film sheet 100a is in the transport rollers 87 and 187, and shaft 201 continues to rotate to complete one revolution. As the leading edge of the film 100 passes the film switch 131, the film moves the switch to the position which completes the circuit from L1 to L2 through the coil of relay 105. The contact arm of contacts 01 of relay 105 then moves to the lock-in position, to lock in relay 105. The contact arm of contacts 02 of relay 105 move to the energized position, thereby connecting terminal N to terminal H.

Figures 8, 9:
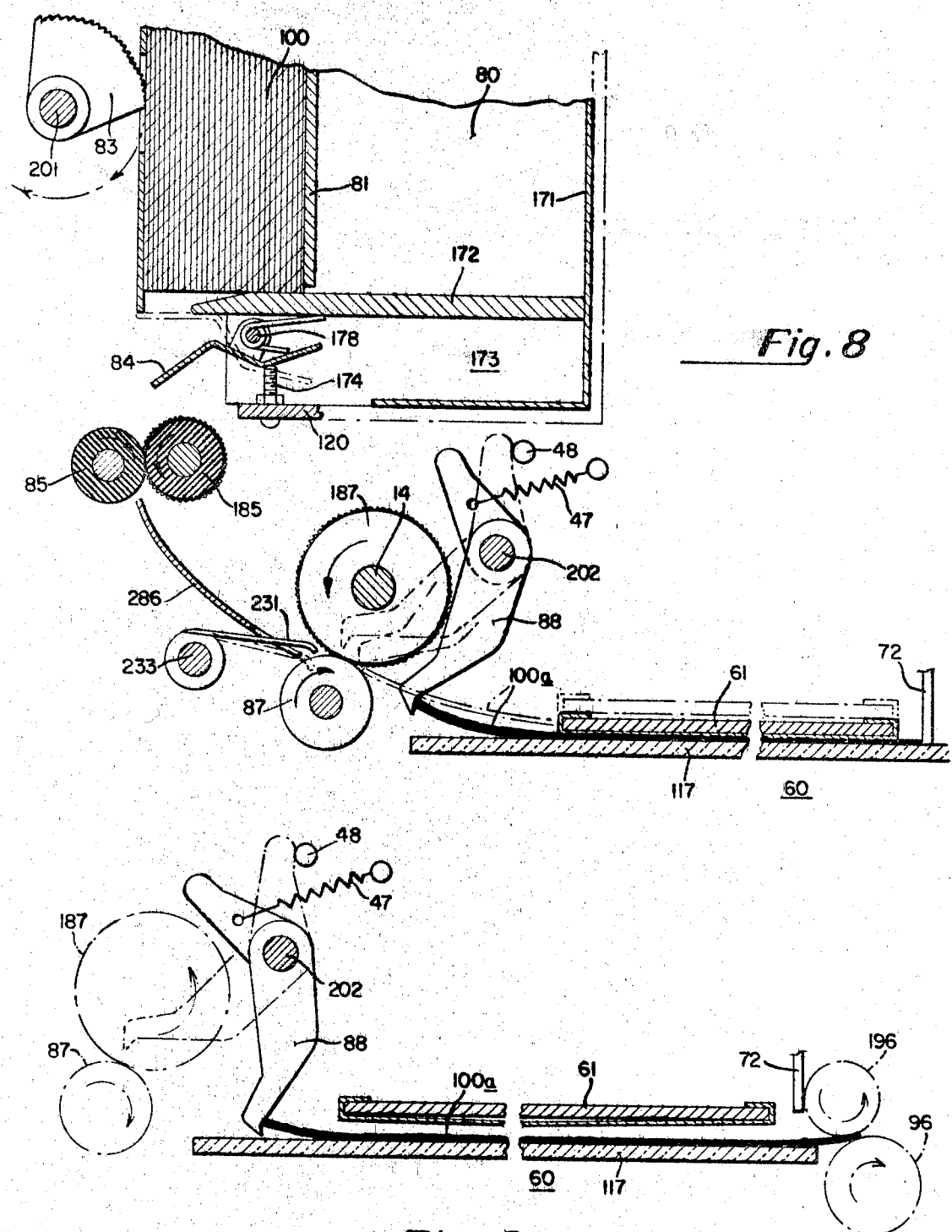
FIG. 8 is a plan view, partly in section, at the supply or feed side of the machine.
FIG. 9 is a diagrammatic plan view, partly in section, looking down at the exposure station.

When the trailing edge of the film 100 passes the film switch 131 the switch relaxes to its original position, and since the contact arm of contacts 02 of relay 105 now connects terminal N to terminal H, a circuit is completed through rectifier 304 and the coil of clutch 112 is energized thereby driving the shaft 12. However, the clutch release solenoid 122 is not at this time energized and its plunger is not withdrawn. Thus, shaft 12 is only permitted by the cam stop 45 to rotate enough to drive the chain 18 and shaft 202 enough to allow the push lever 88 to push the trailing edge of the film into the exposure screen 117. This latter position of the film is illustrated in FIG. 8. When shaft 122 rotates, it carries with it cam switch 324, and cam switch 324 moves to close the circuit to energize the coil of relay 106. When rotation of shaft 12 is stopped by cam stop 45, the lower shaft 212 continues to rotate, and clutch 112 slips, the slippage being controlled by adjustment of resistor 313.

When relay 106 is energized the parallel contact arms of contacts 01 and 02 of relay 106 move to the energized positions and complete a circuit through rectifier 305, thereby energizing the plate-closing solenoid 161, and also energizes the film counter 163 which is connected in parallel therewith.

When the plate-closing solenoid 161 is energized, the plate 61 is moved by the linkage shown in FIGS. 5 and 7 to the forward or closed position and four plate switches 151—154 (FIG. 7) are moved as follows:

Plate switch 154 is moved to the energized position, thereby energizing a card flasher lamp.

Plate switch 153 (FIG. 18) closes, putting the coil of relay 107 in a circuit ready to receive the 120 v. AC line voltage during the timed exposure only.

Plate switch 152 opens, thereby opening the circuit between terminal P and terminal B.

Plate switch 151 opens, thereby releasing the lock-in of relay 102 and removing the L1 potential from the terminal C. This deenergizes the main drive motor 205 and shuts down the unit which is now ready for the exposure.

When the timed exposure is made, the coil of relay 107 is energized, as indicated in FIG. 18. The contact arm of contacts 02 of relay 107 moves to the energized position, thereby completing a circuit through the coil of relay 108 and energizing the relay. The contact arm of contacts 01 of relay 108 moves to the energized position, thereby locking in the coil of relay 108. Thus, when, at the end of the timed exposure, the coil of relay 107 is deenergized and the contact arms of relay 107 move to the deenergized positions, L1 potential is provided to terminal J through the contacts 01 of the energized relay 108 and the contacts 01 of the deenergized relay 107.

At the instant that relay 107 is deenergized, L1 potential is applied to terminal B through contacts 01 of energized relay 108, contacts 01 of deenergized relay 107, terminal J, and contacts 02 of energized relay 108. This completes a circuit through rectifier 306 and energizes the plate-opening solenoid 162. As a result, the pressure plate 61 is withdrawn rearwardly by the linkage shown in FIGS. 5 and 7.

The appearance of L1 potential at terminal B also completes a circuit through terminal A1 and rectifier 301 and energizes the drive motor 205.

The appearance of L1 voltage at terminal B also completes a circuit through the again closed plate switch 152, terminal P, the contact arm of contact 03 of energized relay 108, and rectifier 304, thereby energizing clutch 112 and again driving shaft 12. At this time, the presence of L1 potential at terminal B has also energized the clutch release solenoid 122, thereby withdrawing the cam stop 45 and allowing rotation of the shaft 12.

When clutch 112 drives the shaft 12, the chain 18 and shaft 202 are driven, and the push arms 88 are moved in a counterclockwise direction from their rest positions, the leftmost phantom position in FIG. 9, and the film is moved into the take-away rollers 96, 196.

The film, guided by guide 97, is moved by the take-away rollers 96, 196 toward the transport rollers 94, 194. As the leading edge of the film approaches the transport rollers 94, 194, the leading edge of the film engages the fingers 232 and trips the film switch 132, thereby completing a circuit from terminal J through the coil of relay 109. The contact arm of contacts 01 of relay 109 then moves to the energized position and locks in the coil of the relay 109.

The appearance of L1 potential at terminal J also energizes the coil of relay 110. The contact arm of contacts 01 of relay 110 then moves to the energized position, to lock in the coil of the relay 110.

The parallel contact arms of contacts 02 and 03 of relay 110 also move to the energized position, thereby energizing the clutch release solenoid 123 and withdrawing the cam stop 46 to allow rotation of shaft 13.

The parallel contact arms contacts 02 and 03 of relay 109 move to the energized position so that when fingers 232 drop off the trailing edge of the film and film switch 132 returns to its original rest position, a circuit is completed from terminal J through the contacts 02 and 03 of relay 109 and through the rectifier 107, thereby energizing clutch 113 and thereby driving the shaft 13 which drives the chain 19 and shaft 204. Rotation of shaft 204 drives the film-pushing cam sectors 93 and stuffs the film into the receiver magazine 90.

When shaft 204 rotates, the cam switch 325 moves to open position, thereby opening the circuit to and deenergizing the clutch release solenoid 123. This returns the cam stop 46 to the stop position, thereby limiting the rotation of shafts 13 and 204 to 360°.

As shaft 204 rotates, it also rotates the cam switch 321, shown at the upper left portion of FIG. 12. When the cam reaches the depressed portion, the switch is moved to a position which opens the circuit to relay 101 and power is removed from all circuits except terminal A2 which feeds power to clutch 113. As the unit coasts to a stop, the cam switch 321 opens the circuit to terminal A2 and again closes the circuit through the coil of relay 101, thereby deenergizing the clutch 113 and reenergizing the relay 101 for the next cycle.

While the preferred embodiment of this invention has been described in some detail, it will be obvious to one skilled in the art that various modifications may be made without departing from the invention as hereinafter claimed.

I claim:

1. An automatic film loader for a chest X-Ray machine comprising:
  a. a supply magazine adapted to hold a supply of cut film, each film of said supply being vertically disposed on one of its edges;
  b. an exposure station;
  c. a receiver magazine for receiving the exposed film;
  d. said supply magazine including an adjustable first pressure plate for pressing the supply of cut film together;
  e. film feed means including:
    1. friction means for frictionally engaging one of said vertically disposed cut films in said supply magazine and feeding from said magazine;
    2. film advance and transport rollers outside said supply magazine and disposed on vertical axes for receiving the cut film fed forwardly thereto by said friction means and for advancing and transporting said film therealong;
  f. first pusher means for pushing against the trailing vertically disposed edge of the transported cut film for pushing said film into final position at said exposure station;
  g. a vertically disposed second pressure plate at the exposure station;
  h. means responsive to said first pusher means having pushed said film into final position at the exposure station for moving said second pressure plate into holding position to hold said film;
  i. a manually operable switch for initiating the exposure of said film at the exposure station for a selected time period;
  j. film take-away means;
  k. means effective automatically at the termination of the timed exposure period for actuating said take-away means for taking the exposed film from the exposure station and moving it toward said receiver magazine;
  l. said take-away means including:
    1. take-away rollers disposed on vertical axes;
    2. means for further actuating said first pusher means for pushing against the trailing vertical edge of said exposed film to push said film beyond the exposure station into said take-away rollers;
    3. second pusher means beyond the take-away rollers for pushing against the trailing vertical edge of said exposed cut film to push said film into said receiver magazine;
  m. means for reducing the pressure of said first pressure plate on the supply of edge stacked film during feeding thereof from said magazine; and
  n. means responsive to termination of said timed exposure period for retracting said second pressure plate from the exposed film at the exposure station.

2. Apparatus according to claim 1 characterized by the provision of:
  a. a manually operable start switch; and
  b. means responsive to actuation of said start switch for actuating said friction means to feed a cut film forwardly.

3. Apparatus according to claim 2 characterized by the provision of:
  a. switch means operable by the film being advanced and transported by said advance and transport rollers for actuating said first pusher means to push said film into the exposure station; and
  b. stop means for preventing the leading edge of said film in said exposure station for entering said take-away rollers.

4. Apparatus according to claim 3 characterized by the provision of:
  a. a main drive motor; and
  b. means responsive to movement of said pressure plate into film-holding position for shutting down said main drive motor.

5. Apparatus according to claim 4 characterized by the provision of means responsive to termination of said timed exposure period for:
  a. energizing the main motor; and
  b. withdrawing the stop means.

6. Apparatus according to claim 5 characterized by the provision of switch means operable by the film passing through the take-away means for actuating said second pusher means to push said exposed film into said receiver magazine.